C. T. BANGS.
TRACTION WHEEL.
APPLICATION FILED APR. 7, 1917.
1,274,841.
Patented Aug. 6, 1918.
2 SHEETS—SHEET 2.
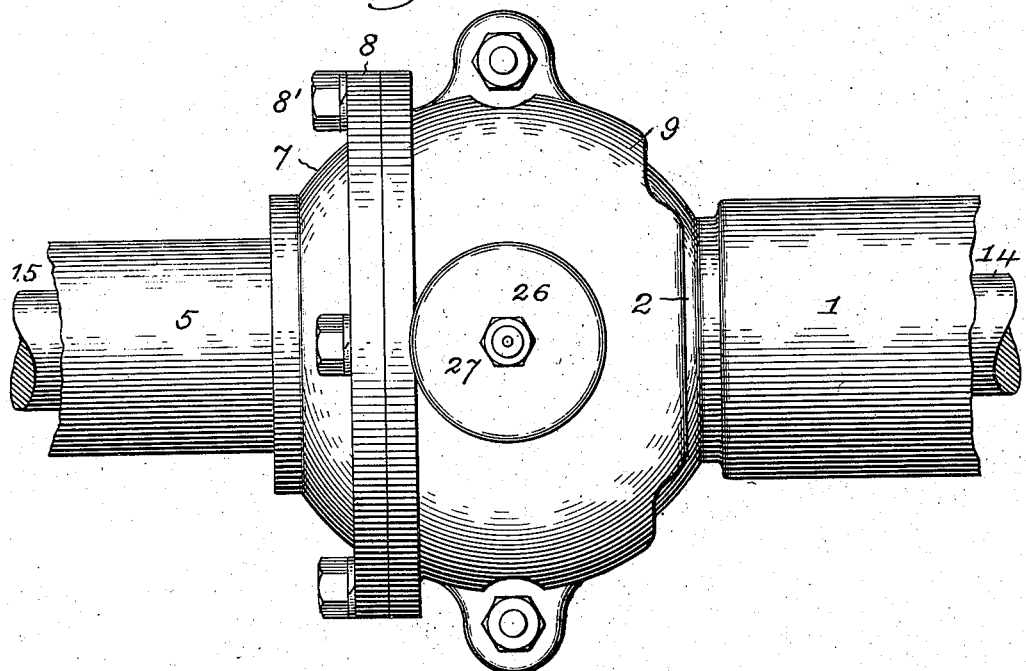
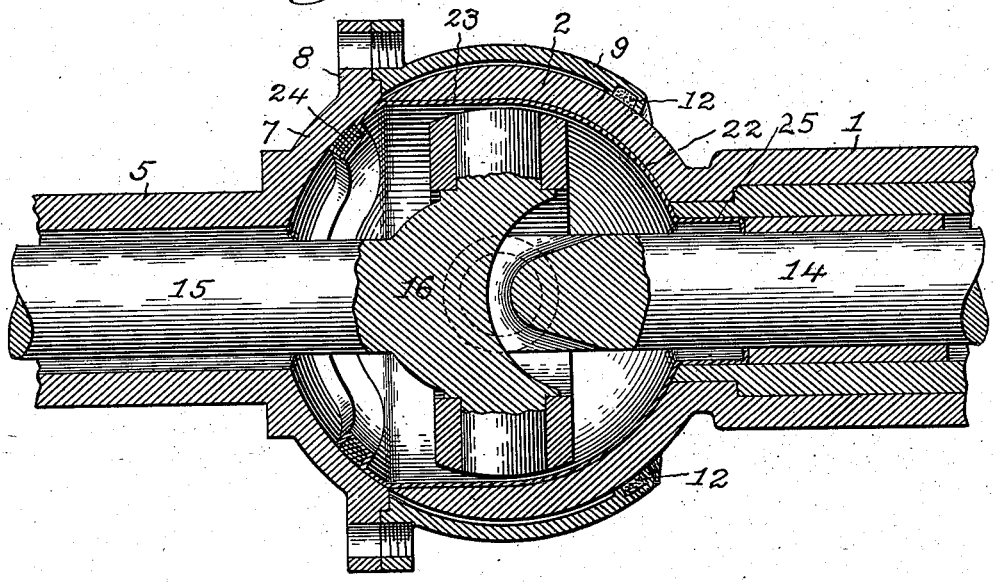
Witness.
John Endere
Inventor:
Chester T. Bangs,
by Robert Burns,
Atty.

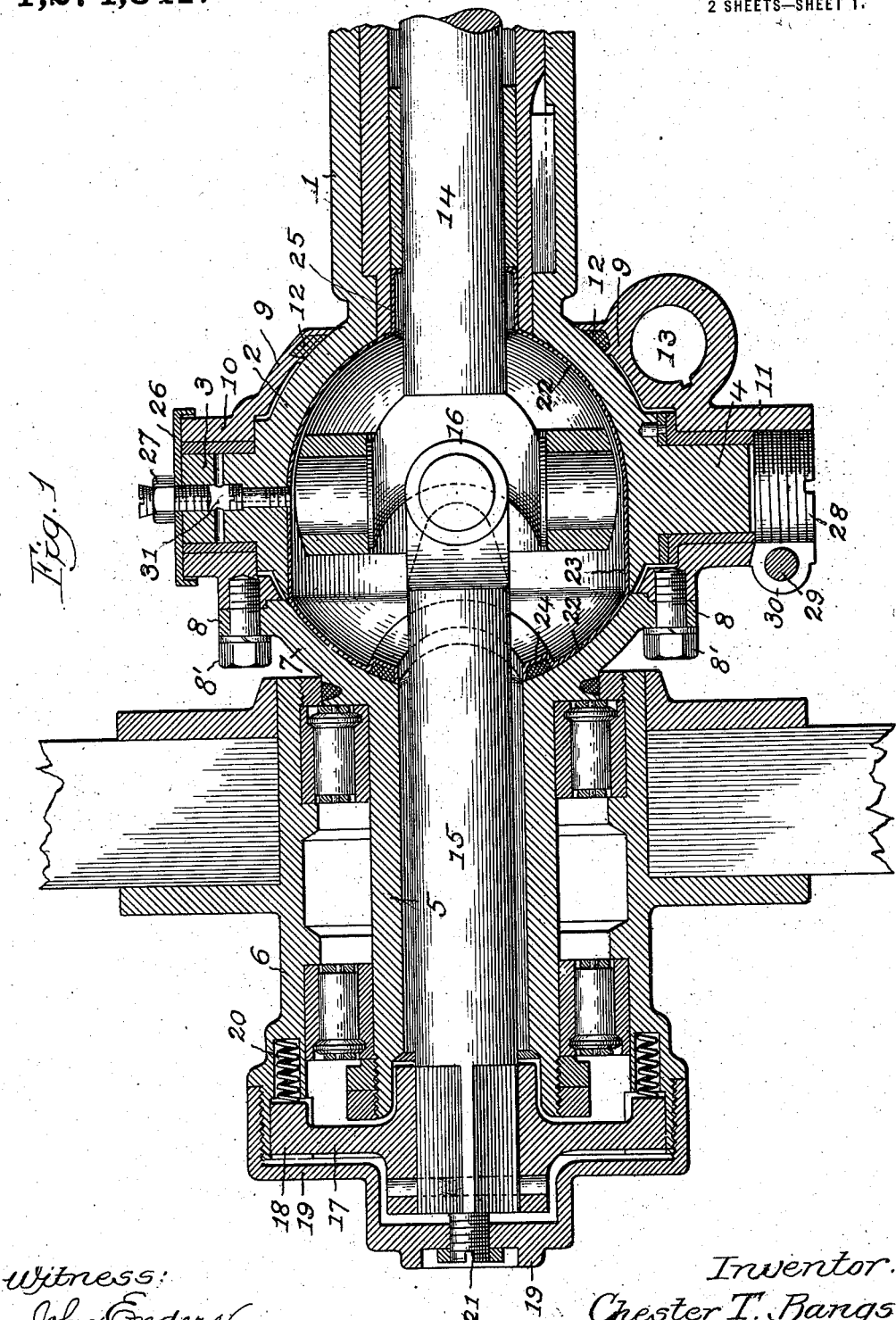

UNITED STATES PATENT OFFICE.

CHESTER T. BANGS, OF HOBART, INDIANA.

TRACTION-WHEEL.

1,274,841.

Specification of Letters Patent.      Patented Aug. 6, 1918.

Application filed April 7, 1917. Serial No. 160,407.

*To all whom it may concern:*

Be it known that I, CHESTER T. BANGS, a citizen of the United States of America, and a resident of Hobart, in the county of Lake, State of Indiana, have invented certain new and useful Improvements in Traction-Wheels, of which the following is a specification.

This invention relates to that class of traction wheels for motor driven vehicles which are capable of a combined driving and steering operation in actual use, an example of which constitutes the subject matter of my prior Patent No. 926,313, dated June 29, 1909. And the present improvement has for its objects:—

To provide a simple and efficient structural formation and association of parts, by which a very effective lubrication of the universal coupling of the sectional driving shaft of the structure, is attained, and leakage of the lubricant prevented as well as the entry of dust to said coupling and associated parts, and with which a strong and substantial pivotal connection is provided between the fixed axle housing and the wheel carrying skein or arbor of the structure.

To provide a simple and efficient means for effecting the proper assemblage of the mechanisms, with a maintenance of the parts in proper operative position and a compensation for wear consequent of extended use. All as will hereinafter more fully appear.

In the accompanying drawings:—

Figure 1, is a longitudinal sectional elevation showing the general structural formation and association of parts in the present invention.

Fig. 2, is a detail plan view of the same.

Fig. 3, is a detail horizontal section of the same.

Similar reference numerals indicate like parts in the several views.

As represented in the drawings, the general structural arrangement of parts in the present structure is similar in a number of features, to the subject matter and claims of my companion application for patent, Serial No. 160,406 filed April 7, 1917, and no detail description thereof is made in the present case.

Referring to the drawings:—

1 designates an end portion of the non-revoluble axle housing of the vehicle, and which in the present improvement is formed with a truncated globular shell or head 2 provided with vertical upper and lower journal trunnions 3 and 4, arranged in diametrically opposed relation on the periphery of said shell or head 2, and adapted for pivotal connection of the hereinafter described hub carrying skein or arbor. The cavity of the shell or head 2 is extended outwardly to the truncated outer end of said shell, in the form of a cylindrical bore adapted to receive and permit the insertion of the globular lubricant containing shell hereinafter described.

5 designates a tubular axle skein or arbor, upon which is revolubly mounted the hub member 6 of a traction wheel in any usual and suitable manner. The inner end of said skein or arbor 5 is formed with an enlarged head 7, the inner face of which is of a concave form, and the outer margin of said head 7 is provided with an attaching flange 8 for the fixed attachment of the pivot shell now to be described:—

9 designates an annular shell or casing, of a concavo-convex form in cross section, encircling the central portion of the globular shell or head 2 above described, and fixedly secured to the aforesaid flange 8 by attaching screws 8' or other usual fastening means. For the purpose of assemblage, the shell or casing 9 will be formed in upper and lower sections, fixedly secured together by any suitable means after assemblage.

10 and 11 designate upper and lower bearing hubs formed in opposed diametric relation on the aforesaid shell or casing 9 and adapted for pivotal engagement with the trunnions 3, 4 of the globular head or shell 2 aforesaid.

12 designates a packing recess or gland formed in the rear portion of the shell or casing 9 and adapted for bearing upon the outer globular surface of the head 2 to prevent leakage of the lubricant, as well as prevent an entry of dirt or dust, between the parts at such point.

13 designates an orificed ear or lug on the shell or casing 9 for the attachment of one end of the steering mechanism of the vehicle.

14 and 15 designate the respective driving and driven shaft sections of the driving means by which the traction wheel is positively rotated. Said shaft sections have the usual alined relation, with their adjacent ends connected together by a universal coupling 16 of any usual and suitable construction.

The coupling 16 above referred to, is so positioned that the axes of the different pivot stems thereof are on a plane common to the axes of the aforesaid trunnions 3, 4 and the associated shaft sections 14, 15 have operative relation to the other parts of the structure, as follows:—

The driving shaft section 14 has the usual bearing in an internal bushing of the axle housing 1, while the aforesaid driven shaft section 15 extends through the axial bore of the axle skein or arbor 5, and at its outer end is provided with a fixed head 17, the perimeter of which is formed with projections or lugs 18 for interengagement with complementary recesses in the interior of an outer cavity in the wheel hub 2, in manner substantially the same as that described and claimed in my aforesaid prior Patent No. 926,313. And as in said patented structure, a hub cap 19 will be employed to inclose said connection.

20 designate a series of coiled springs arranged in recesses in the outer end of the wheel hub 2, and adapted to exert an outward stress against the aforesaid fixed head 17 of the driven shaft section 15 with a tendency to resist the outward surges of the wheel hub 2 and associated parts, in actual use.

21 designates an axially arranged abutment screw, screwing through the hub cap 19 aforesaid, and adapted to effect a longitudinal adjustment of the driven shaft section 15 and associated coupling 16 into the before described relation to the trunnions 3, 4, as the parts became worn in use, as well as in effecting an initial assemblage of the parts.

22 designates an approximately globular holding shell adapted to contain a quantity of lubricant, and fitting in a close manner the cavity of the globular head or shell 2, and the concave inner end of the enlarged head 7 before described. And with a view to the attainment of the close fit above described, the said holding shell 22 will be formed with a cylindrical central portion 23 fitting the aforesaid cylindrical bore of the outer portion of the globular head or shell 2, with the adjacent outer portion of said holding shell 22 of a spherical form having contact with the aforesaid concave inner face of the enlarged head 7 of the axle skein or arbor 5 aforesaid.

The globular holding shell 22 is formed with diametrically opposite orifices corresponding with the bore of the axle housing 1, and with the bore of the axle skein or arbor 5, respectively, and said last mentioned orifice will have a horizontally elongated form, to permit of the usual independent pivotal movement in a horizontal plane, of the driven shaft section 15 and parts moving in unison therewith.

24 designates a packing gland or recess at the margin of the elongated orifice just described, and adapted to prevent leakage of lubricant at such point from the interior of the shell 22.

25 designates a cylindrical neck or extension on the holding shell 22 aforesaid, formed to fit the bore of the outer end of the axle housing 1, to aid in maintaining said shell 22 in proper place.

26 designates a bearing collar adjustably attached to the outer end of the upper trunnion 3 by a screw bolt 27, and adapted to have bearing on the top surface of the upper journal hub 10 of the annular shell 9 aforesaid, to assist in holding the pair of trunnions 3, 4, in proper position, and in resisting downward thrusts on said trunnions in actual use.

28 designates a screw-threaded head screwing into the lower screw-threaded bore of the lower journal hub 11 aforesaid, and providing an adjustable abutment adapted to resist downward thrusts thereon in actual use, and at the same time provide a simple and substantial means for positioning the parts in an initial assemblage, and in taking up wear from continued actual use.

29 designates a transverse locking screw-bolt associated with separated ears 30 on the slitted lower portion of the lower journal hub 11 aforesaid, and adapted to contract and bind the same upon the abutment head 28 aforesaid, to hold the same at its vertical adjustment.

31 designates an axial bore formed in the upper trunnion 3 aforesaid, and adapted to receive the aforesaid screw-bolt 27 and at the same time provide a passage for the lubricant to the parts to be lubricated, as set forth in detail, and claimed, in my aforesaid companion application for patent.

Having thus fully described my said invention, what I claim as new and desire to secure by Letters Patent, is:—

1. In a combined steering and traction wheel of the class wherein the carrying arbor of the wheel is provided at one end with a hollow globular shape casing, and the axle frame is provided with a companion hollow globular shape casing fitting inside the aforesaid casing of the wheel arbor and carrying upper and lower trunnions engaging bearing hubs on said wheel arbor casing, the two shells forming an inclosure for the universal coupling of the driving shaft of the wheel, the combination of the axle frame casing having its cavity formed with a cylindrical extension at its outer end, and a lubricant containing shell arranged in the cavity of the aforesaid casing and comprising inner and outer globular portions connected together by an intermediate cylindrical portion, substantially as set forth.

2. In a combined steering and traction wheel of the class wherein the carrying arbor of the wheel is provided at one end with a hollow globular shape casing, and the axle frame is provided with a companion hollow globular shape casing fitting inside the aforesaid casing of the wheel arbor and carrying upper and lower trunnions engaging bearing hubs on said wheel arbor casing, the two shells forming an inclosure for the universal coupling of the driving shaft of the wheel, the combination of the axle frame casing having its cavity formed with a cylindrical extension at its outer end, and a lubricant containing shell arranged in the cavity of the aforesaid casing and comprising inner and outer globular portions connected together by an intermediate cylindrical portion and provided at one end with a cylindrical neck having a holding fit in a bore in the axle frame, substantially as set forth.

3. In a combined steering and traction wheel of the class wherein the carrying arbor of the wheel is provided at one end with a hollow globular shape casing and the axle frame is provided with a companion hollow globular shape casing fitting inside the aforesaid casing of the wheel arbor and carrying upper and lower trunnions engaging bearing hubs on said wheel arbor casing, the two shells forming an inclosure for the universal coupling of the driving shaft of the wheel, the combination of the axle frame casing having its cavity formed with a cylindrical extension at its outer end, and a lubricant containing shell arranged in the cavity of the aforesaid casing and comprising inner and outer globular portions connected together by an intermediate cylindrical portion and provided at one end with a cylindrical neck having a holding fit in a bore in the axle frame and with a horizontally elongated orifice at its opposite end, substantially as set forth.

4. In a combined steering and traction wheel of the class wherein the carrying arbor of the wheel is provided at one end with a hollow globular shape casing, and the axle frame is provided with a companion hollow globular shape casing fitting inside the aforesaid casing of the wheel arbor and carrying upper and lower trunnions engaging bearing hubs on said wheel arbor casing, the two shells forming an inclosure for the universal coupling of the driving shaft of the wheel, the combination of the axle frame casing having its cavity formed with a cylindrical extension at its outer end, and a lubricant containing shell arranged in the cavity of the aforesaid casing and comprising inner and outer globular portions connected together by an intermediate cylindrical portion and provided at one end with a cylindrical neck having a holding fit in a bore in the axle frame and with horizontally elongated orifice at its opposite end, said orifice being provided with a marginal packing gland, substantially as set forth.

Signed at Chicago, Illinois, this 27th day of March, 1917.

CHESTER T. BANGS.